(12) United States Patent
Zeev

(10) Patent No.: US 11,957,640 B2
(45) Date of Patent: *Apr. 16, 2024

(54) METHOD AND PRODUCT FOR A CUSTOMIZED 3D PRINTED NIPPLE FOR BREASTFEEDING MOTHERS

(71) Applicant: Proxamama LLC, Las Vegas, NV (US)

(72) Inventor: Shilo Ben Zeev, Las Vegas, NV (US)

(73) Assignee: Proxamama LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/836,636

(22) Filed: Jun. 9, 2022

(65) Prior Publication Data

US 2022/0296475 A1  Sep. 22, 2022

Related U.S. Application Data

(62) Division of application No. 17/462,826, filed on Aug. 31, 2021, now Pat. No. 11,357,707.

(Continued)

(51) Int. Cl.
*A61J 11/00* (2006.01)
*B33Y 80/00* (2015.01)

(52) U.S. Cl.
CPC ............ *A61J 11/005* (2013.01); *A61J 11/002* (2013.01); *B33Y 80/00* (2014.12)

(58) Field of Classification Search
CPC ........ A61J 11/005; A61J 11/002; B33Y 80/00
See application file for complete search history.

(56) References Cited

U.S. PATENT DOCUMENTS 2,372,281 A * 3/1945 Jordan .................. A61J 11/001
215/11.1
2,669,234 A * 2/1954 Baracate ................ A61J 11/02
215/11.4

(Continued)

FOREIGN PATENT DOCUMENTS

| GB | 934534 A | 8/1963 | |
| WO | 2006/098903 A1 | 9/2006 | |
| WO | WO-2010046812 A1 * | 4/2010 | ............ A61J 11/006 |

OTHER PUBLICATIONS

International Search Report and Written Opinion from International Application No. PCT/US2021/048453 dated Feb. 7, 2022.

*Primary Examiner* — Tri M Mai
(74) *Attorney, Agent, or Firm* — Greenberg Traurig, LLP

(57) ABSTRACT

A feeding device includes a fluid reservoir and a nipple configured to be attached to the fluid reservoir. The nipple includes a body portion defining a compartment configured to contain a liquid so as to mimic a feel of a mother's breast. The body portion comprises a nipple tip comprising a fluid outlet. The nipple includes a base member attached to the body portion, the base member including an attachment portion configured to attach the nipple to the fluid reservoir. The base member comprises a fluid inlet in fluid communication with the fluid reservoir. The nipple includes a fluid passageway extending through the compartment from the fluid inlet to the nipple tip, where the fluid passageway allows fluid to flow from the fluid reservoir to the fluid outlet. A valve member positioned on the base member adjusts a flow rate of fluid from the fluid reservoir into the fluid passageway.

10 Claims, 15 Drawing Sheets

Related U.S. Application Data

(60) Provisional application No. 63/214,590, filed on Jun. 24, 2021, provisional application No. 63/072,409, filed on Aug. 31, 2020.

(56) References Cited

U.S. PATENT DOCUMENTS

| | | | |
|---|---|---|---|
| 2,745,568 | A | 5/1956 | Newton |
| 2,827,191 | A | 3/1958 | Baracate |
| 4,734,078 | A * | 3/1988 | Moreau ................. A41C 3/105 450/38 |
| 5,295,597 | A | 3/1994 | Green |
| 6,818,162 | B1 | 11/2004 | Hoffman et al. |
| 7,032,764 | B2 | 4/2006 | Viggiano |
| 7,320,678 | B2 | 1/2008 | Ruth et al. |
| 9,168,204 | B2 * | 10/2015 | Pfenniger ................. A61J 9/04 |
| 10,149,800 | B2 * | 12/2018 | Brown ................. A61J 11/0015 |
| 10,568,996 | B2 | 2/2020 | Aalders et al. |
| 11,172,773 | B2 | 11/2021 | Kim |
| D990,662 | S | 6/2023 | McCracken et al. |
| 2004/0010311 | A1 * | 1/2004 | Reynolds ................. A61F 2/52 623/7 |
| 2015/0290087 | A1 * | 10/2015 | Kirkland ................. A61J 9/00 215/11.5 |
| 2017/0312185 | A1 | 11/2017 | Lofaro et al. |
| 2018/0055978 | A1 * | 3/2018 | Ong ...................... A61M 1/068 |
| 2018/0361040 | A1 | 12/2018 | O'Toole et al. |
| 2019/0046414 | A1 | 2/2019 | Gledhill |
| 2019/0291307 | A1 | 9/2019 | Wright |
| 2021/0387787 | A1 * | 12/2021 | Gonzales ........... B65D 75/5883 |

* cited by examiner

METHOD AND PRODUCT FOR A CUSTOMIZED 3D PRINTED NIPPLE FOR BREASTFEEDING MOTHERS

RELATED APPLICATIONS

This application claims the benefit of and priority to U.S. Provisional Application Ser. No. 63/072,409, filed Aug. 31, 2020, and U.S. Provisional Application Ser. No. 63/214,590, filed Jun. 24, 2021, the entire disclosures of which are incorporated herein by reference in their entireties.

FIELD OF INVENTION

The present disclosure relates generally to feeding devices for infants. Specifically, the present disclosure relates to customized, 3D printed nipples for feeding devices for infants.

BACKGROUND OF THE INVENTION

Feeding devices, such as baby bottles, are often used to feed babies from newborns to toddlers for various reasons. Reasons for using a feeding device include, but are not limited to: latching difficulties by the baby, inability for the mother to produce enough milk, feeding by a caregiver or physician other than the mother, inability for the mother to breastfeed for health reasons, weaning of the baby, etc.

SUMMARY OF THE INVENTION

The summary is a high-level overview of various aspects of the invention and introduces some of the concepts that are further detailed in the Detailed Description section below. This summary is not intended to identify key or essential features of the claimed subject matter, nor is it intended to be used in isolation to determine the scope of the claimed subject matter. The subject matter should be understood by reference to the appropriate portions of the entire specification, any or all drawings, and each claim.

Embodiments of the present disclosure relate to a feeding device including a fluid reservoir; a nipple configured to be attached to the fluid reservoir; where the nipple includes: a body portion defining a compartment therein; where the compartment is configured to contain a liquid so as to mimic a feel of a mother's breast; where the body portion includes a nipple tip comprising a fluid outlet; a base member configured to be attached to the body portion; where the base member includes an attachment portion configured to attach the nipple to the fluid reservoir; where the base member includes a fluid inlet that is in fluid communication with the fluid reservoir; a fluid passageway extending through the compartment from the fluid inlet of the base member to the nipple tip; where the fluid passageway is a cylindrical tube including a channel extending therethrough; where the fluid passageway is configured to allow fluid to flow from the fluid reservoir to the fluid outlet; and a valve member positioned on the base member; where the valve member is a threaded valve member including: a threaded portion; a piston attached to the threaded portion; and a valve opening; where the threaded valve member is configured so that rotation of the threaded portion in a first direction moves the piston toward the valve opening to decrease a flow rate of fluid through the valve opening; and where the threaded valve member is configured so that rotation of the threaded portion in a second, opposing, direction moves the piston away from the valve opening to increase a flow rate of fluid through the valve opening; where the valve member is configured to adjust a flow rate of fluid from the fluid reservoir into the fluid passageway.

In some embodiments, the liquid includes water, oil or a combination thereof.

In some embodiments, the fluid outlet includes at least one hole open to the fluid passageway.

In some embodiments, the base member includes a sealable port fluidly connected to the compartment; where the sealable port is configured to allow fluid to be provided to the compartment.

In some embodiments, the base member is integrally formed with the body portion.

In some embodiments, the fluid reservoir includes a flexible venting valve, where the flexible venting valve is configured to relieve vacuum pressure within the fluid reservoir.

In some embodiments, the nipple includes a first neck portion; the fluid reservoir includes a second neck portion; and the first neck portion is configured to engage with the second neck portion.

In some embodiments, the first neck portion includes a first threading; the second neck portion includes a second threading; and the first threading is configured to engage with the second threading to fluidly seal the nipple and the fluid reservoir.

In some embodiments, the first threading includes at least one break therein; where the at least one break is configured to allow air into the fluid reservoir to relieve vacuum pressure therein.

Embodiments of the present disclosure also relate to a feeding device including: a fluid reservoir; a nipple configured to be attached to the fluid reservoir; where the nipple includes: a body portion defining a compartment therein; where the compartment is configured to contain a liquid so as to mimic a feel of a mother's breast; where the body portion includes a nipple tip comprising a fluid outlet; a base member configured to be attached to the body portion; where the base member includes an attachment portion configured to attach the nipple to the fluid reservoir; where the base member includes a fluid inlet that is in fluid communication with the fluid reservoir; a fluid passageway extending through the compartment from the fluid inlet of the base member to the nipple tip; where the fluid passageway is configured to allow fluid to flow from the fluid reservoir to the fluid outlet; and a valve member positioned on the base member; where the valve member is configured to adjust a flow rate of fluid from the fluid reservoir into the fluid passageway.

In some embodiments, the valve member is an adjustable valve member including a rotating valve dial comprising at least two openings; where the at least two openings are different in size such that each of the at least two openings allows fluid to flow into the fluid passageway at a different flow rate.

In some embodiments, the fluid passageway is a series of small diameter tubes.

In some embodiments, the base member includes a sealable port fluidly connected to the compartment; where the sealable port is configured to allow fluid to be provided to the compartment.

In some embodiments, the base member is connected to the body portion via a barbed fitting.

Embodiments of the present disclosure also relate to a method including: determining a peak vacuum range of an individual mother; where the determining of the peak vacuum range of the individual mother includes: attaching a first end of a breast pump tubing of a breast pump to a breast pump motor of the breast pump; attaching a second end of the breast pump tubing to a pressure gauge; positioning a pressure transducer of the pressure gauge at a location where a breast pump shield of the breast pump would be positioned during a pumping session with the individual mother; setting a vacuum strength of the breast pump motor at a minimum level; turning on the breast pump; increasing the vacuum strength to a maximum comfort level for the individual mother; measuring, via the pressure gauge, the vacuum strength at the maximum comfort level; producing a nipple for a feeding device; where the nipple includes a valve member; where the valve member requires application of a vacuum having the vacuum strength for fluid to flow therethrough.

In some embodiments, the vacuum strength is from −197±10 mmHg to −150 mmHg.

In some embodiments, the method further includes producing the nipple by 3D printing.

In some embodiments, the valve member is a threaded valve member including: a threaded portion; a piston attached to the threaded portion; and a valve opening; where rotation of the threaded portion in a first direction moves the piston toward the valve opening to decrease a flow rate of fluid through the valve opening; and where rotation of the threaded portion in a second, opposing, direction moves the piston away from the valve opening to increase a flow rate of fluid through the valve opening.

In some embodiments, the valve member is an adjustable valve member including a rotating valve dial including at least two openings; where the at least two openings are different in size such that each of the at least two openings allows fluid to flow through the valve member a different flow rate.

BRIEF DESCRIPTION OF THE DRAWINGS

The accompanying drawings are included to provide a further understanding of the disclosure and are incorporated in and constitute a part of this specification, illustrate embodiments, and together with the description serve to explain the principles of the present disclosure.

DETAILED DESCRIPTION

Figure 1:
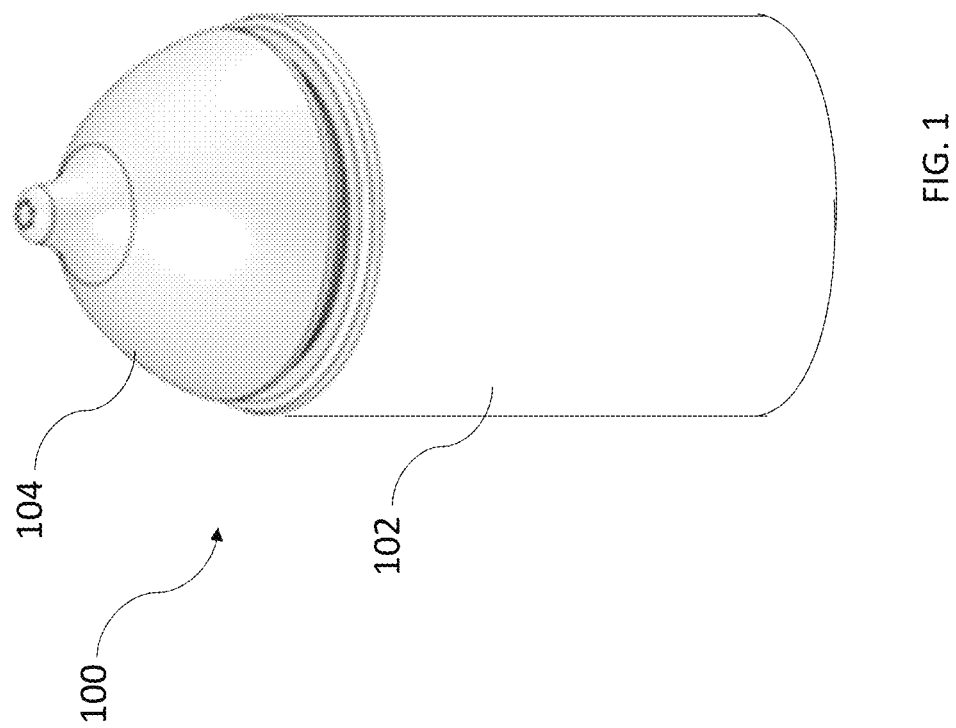
FIG. 1 is a perspective view of a feeding device, according to embodiments of the present disclosure.
Figure 2:
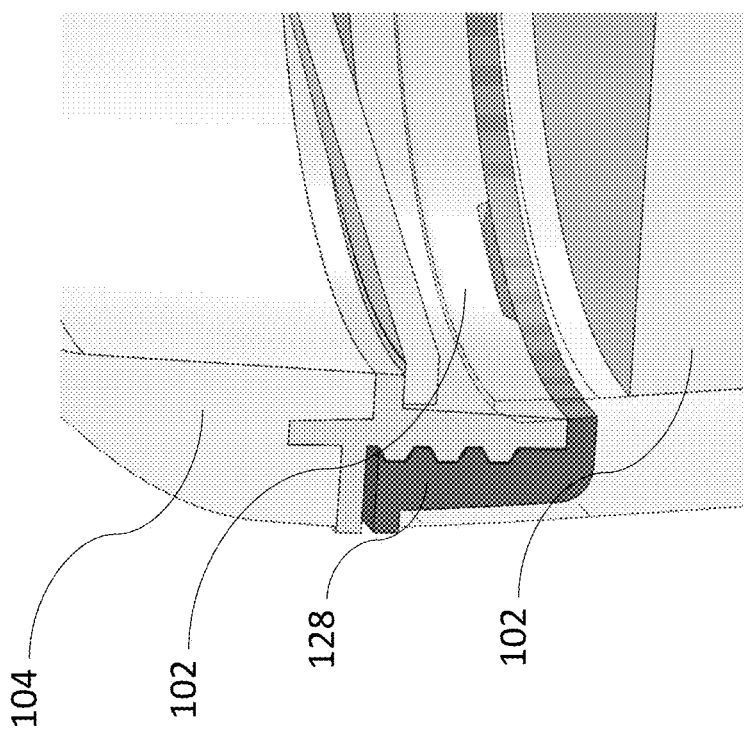
FIG. 2 is a perspective view of a fluid reservoir of the feeding device, according to embodiments of the present disclosure.

Persons skilled in the art will readily appreciate that various aspects of the present disclosure can be realized by any number of methods and apparatus configured to perform the intended functions. It should also be noted that the accompanying figures referred to herein are not necessarily drawn to scale but may be exaggerated to illustrate various aspects of the present disclosure, and in that regard, the figures should not be construed as limiting.

In some embodiments, the invention solves at least one the following problems: 18% of breastfeeding infants are unable or unwilling to drink from bottles; 83% of breastfeeding mothers report feeling criticized via looks of disapproval or derogatory remarks while nursing in public; 60% of breastfeeding mothers experience sore, cracked or bleeding nipples; 42% report infant trouble latching on in the first two weeks.

In some embodiments, the present invention is a self-sanitizing product. In some embodiments, the present invention provides the ability to control flow using a bottle. In some embodiments, the present invention provides substantial relief to mother when nipples are tender or sore in early days of breastfeeding. In some embodiments, the present invention substantially reduces and/or prevents an infant from developing nipple confusion or preference for a natural nipple versus a generic nipple. In some embodiments, the present invention is a pacifier.

In some embodiments, the present invention is a custom 3D printed nipple based on digital data taken from a mother's breast. In some embodiments, the mother's precise nipple profile is integrated into bio-compatible nipples for bottle feeding and pacifiers.

In some embodiments, the method of providing the custom 3D printed nipple is the following steps:
  a) a scan (e.g. make an image) is captured of the breast/nipple using a camera. For example, the camera on a smartphone is used to image the nipple/breasts. In another example, an "app" on the smartphone is used to take the image, store the image and send the image via a confidential link to an approved site.
  b) Information is provided to the confidential site. For example, an on-line form is filled out with such information, for example, bottle size, size and composition; and other preferences and sent to the website.
  c) The manufacturer then translates the image, 3D prints the nipple based on the image and customizes the fit (e.g. threads) for the selected bottle.

In some embodiments, the system will identify landmarks with computer vision and update a parametric 3D model that will be used to fabricate the custom 3D printed nipple.

In some embodiments, the product results in new mothers having the ability to procure custom nipples and pacifiers for their newborns based on their own personal anatomy. For example, the product augments nursing a newborn with a custom nipple and pacifier to reduce "nipple confusion" and/or aid in nipple preference.

In some embodiments, the product system achieves one or more of the following functions:

a) A custom Smartphone mobile iOS and Android app to allow mothers of newborns to capture the physical anatomy of their nipple-areola complex for the purpose of creating faithful 3D printed recreations of nipples for bottle feeding and pacifiers for their newborns when they are not able to nurse their infants.

b) Replicas of mother's nipple-areola complex is produced via 3D printing in the form of physiologic accurate nipples for bottle-feeding and pacifiers.

In some embodiments, the nipple and/or pacifier will be composed of current FDA approved materials such as food grade silicone or latex.

In some embodiments, the geometry (e.g. structure, back pressure, valve) of the nipple results in a safe and effective nutritive sucking—the synchronous activities of sucking, swallow processing, and breathing.

In some embodiments, the geometry of the nipple results in the proper functioning of sucking, the swallow processing, and respiration needed to occur at two levels: first, the elements within each function must reach an appropriate functional maturation that can work in synchrony with each other to generate an appropriate suck, swallow process, and respiration; and second, the elements of all these distinct functions, in turn, must be able to do the same at an integrative level to ensure the safe and efficient transport of a bolus from the mouth to the stomach.

In some embodiments, the geometry of the nipples achieves the details described in the scientific journal, "Tongue movement and intra-oral vacuum in breastfeeding infants," Donna T. Geddes, Jacqueline C. Kent, Leon R. Mitoulas, Peter E. Hartmann (The University of Western Australia, Biochemistry and Molecular Biology, School of Biomedical, Biomolecular and Chemical Sciences, Faculty of Life and Physical Sciences, Australia Medical Research Coordinator, Medela AG, Medical Technology, Lättichstrasse 4b, 6341 Baar, Switzerland) (Received 1 Feb. 2007; received in revised form 21 Aug. 2007; accepted 20 Dec. 2007). In some embodiments, the geometry of the nipple achieves: a) a mean breastfeed duration of 8 min 16 s±2 min 45 s with a mean milk intake of 63±31 g; b) a mean vacuum of −114±50 mmHg; c) a peak vacuum of −145±58 mmHg and baseline vacuum was −64±45 mmHg.

In some embodiments, the geometry of the nipple is configured so that the position of the nipple in the infant's mouth is both the tongue up and tongue down phase of the suck cycle which the peak and baseline vacuum applied by the infant.

In some embodiments, based on the age of the infant, the geometry of the nipple is configured so as to mimic a peak vacuum of −197±10 mmHg [28] to −150 mmHg. In some embodiments, for younger infants of 4-5 days old, the geometry of the nipple is configured so as to result in a lower vacuum on average peak vacuum −112 mmHg.

In some embodiments, the present invention comprises an elastomeric insert adapted to interface with features on the underneath of the nipple. For example, the elastomeric insert deforms under the sucking conditions to provide direct fluid communication between the liquid within the bottle and the opening in the nipple tip. In another example, an air intake, regulated at least in part by the insert, allows for gas to enter the dispenser to occupy the volume previously occupied by liquid that has exited the dispenser. In one embodiment, the sucking pressure to withdraw liquid from the bottle may remain relatively constant.

The exemplary embodiments of the present invention are described and illustrated below to encompass valves, systems, and methods for regulating the flow of liquid through a feeding device.

Turning to FIG. 1, a feeding device 100 is depicted. In some embodiments, the feeding device 100 includes a fluid reservoir 102 and a nipple 104 that is removably attachable to the fluid reservoir 102. In some embodiment, the fluid reservoir 102 is a bottle-type container frequently used for feeding infants. In some embodiments, the fluid reservoir 102 is cylindrical. However, in other embodiments, the fluid reservoir may be any shape. The fluid reservoir 102, in some embodiments, is formed of a rigid material. In other embodiments, the fluid reservoir 102 is formed of a flexible material to allow compression of the fluid reservoir 102. In some embodiments, the fluid reservoir 102 can hold from 4 oz to 8 oz of fluid; or from 4 oz to 6 oz of fluid, or from 6 oz to 8 oz of fluid.

In some embodiments, the fluid reservoir 102 includes a neck portion 128 configured for coupling the fluid reservoir 102 to the nipple 104. In some embodiments, the neck portion 128 includes an opening 129 that is configured to allow flow of fluid from the fluid reservoir 102 to the nipple 104. In some embodiments, the fluid reservoir comprises a flange 106 extending outwardly from a neck portion 128 thereof for engaging with a flange of the nipple 104, as will be described in further detail below. In some embodiments, the fluid reservoir 102 comprises threading (not shown) extending outwardly from the neck portion 128.

Figure 3:
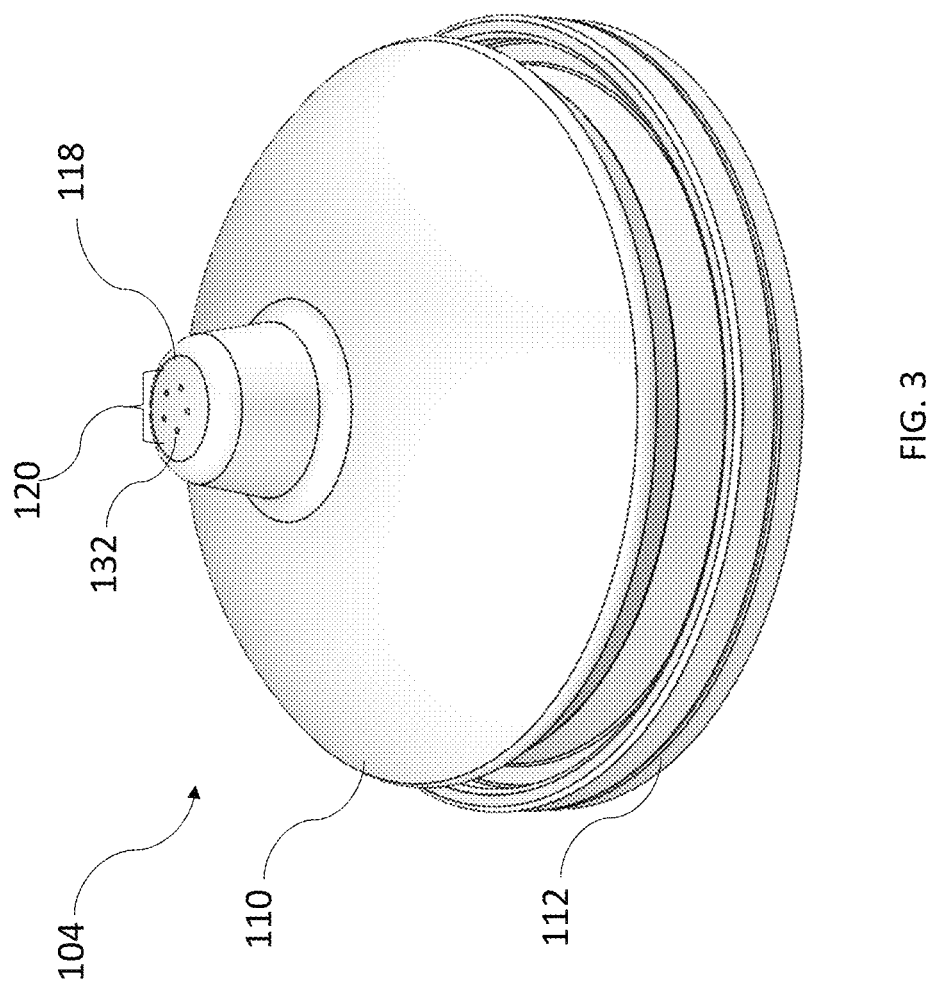
FIG. 3 is a perspective view of a nipple of the feeding device, according to embodiments of the present disclosure.
Figure 4:
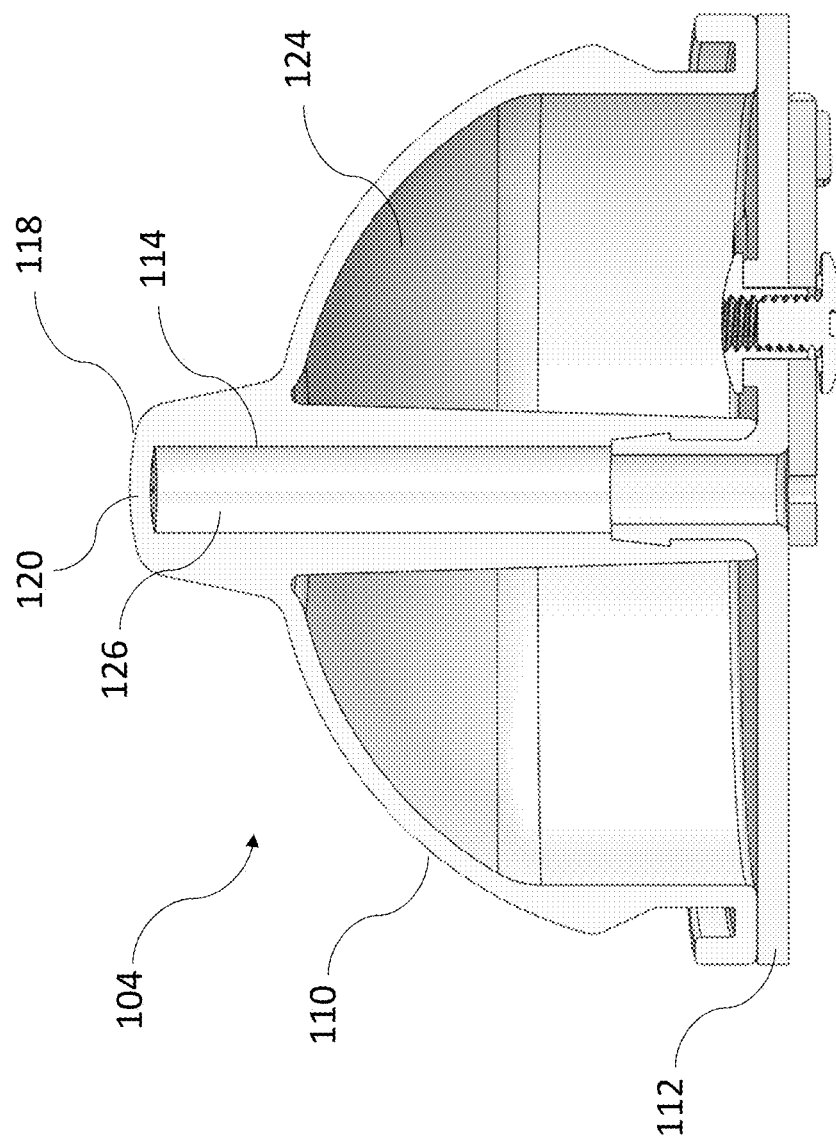
FIG. 4 is a cross-sectional view of a nipple of the feeding device, according to embodiments of the present disclosure.

In some embodiments, the nipple 104 is shaped to closely simulate the shape and look and shape of a mother's breast and nipple area. In some embodiments, the nipple 104 comprises a body portion 110, a base member 112, a fluid passageway 114, and an adjustable valve member 116, as depicted in FIGS. 3-4. The nipple 104 extends from the base member 112, which is adjacent to the fluid reservoir 102, to a nipple tip 118, which has a fluid outlet 120 and is configured to be positioned within the mouth of an infant. In some embodiments, the base member 112 is coupled to the body portion 110 to form the nipple 104, as will be described in further detail below.

In some embodiments, the geometry of the nipple 104 is configured so as to result in a vacuum that reflects the seal formed on a mother's breast by an infant prior to active sucking. This seal is reflected in the small amount of movement of the nipple 104 when the infant applies vacuum by the downward movement of the tongue.

In some embodiments, the body portion 110 is shaped to mimic the shape of the mother's nipple. In some embodiments, the body portion 110, when coupled to the base member 112, defines an enclosed compartment 124 therein. The compartment 124 is configured to contain a liquid such as, for example, oil, water or a combination thereof, to simulate the internal breast tissue and milk volume of a mother's breast.

In some embodiments, the base member 112 is coupled to the body portion 110 to fluidly seal the compartment 124. In some embodiments, the base member 112 comprises a rigid plastic. In some embodiments, the base member 112 comprises polypropylene, silicone or any other food safe and food grade plastic.

Figure 5:
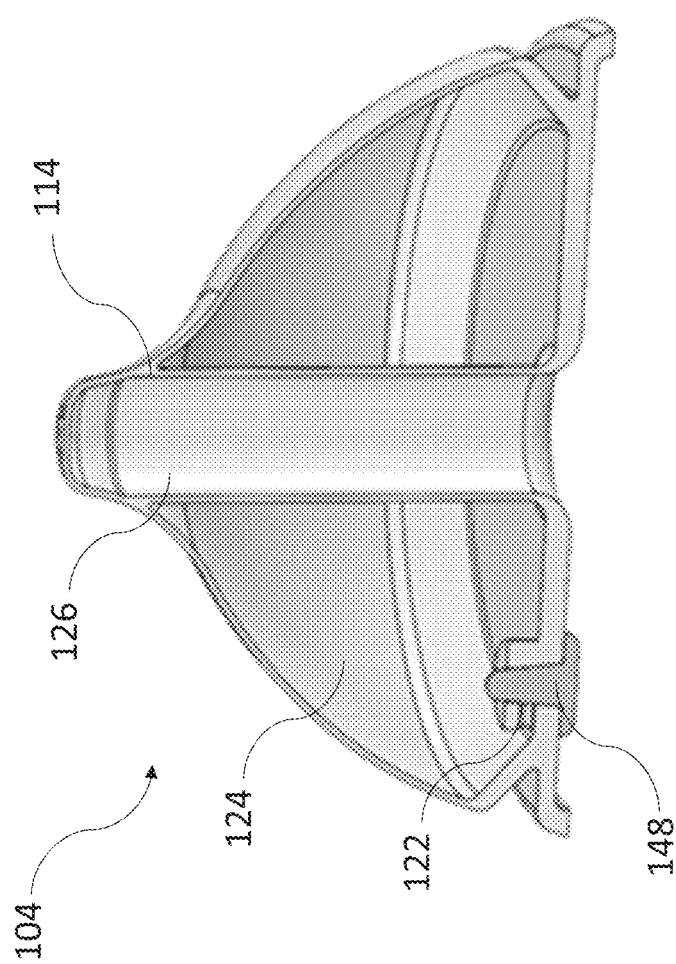
FIG. 5 is a cross-sectional view of a nipple of the feeding device with a cylindrical fluid passageway, according to embodiments of the present disclosure.

In some embodiments, the base member 112 includes a sealable port 122 that is fluidly connected to the compartment 124 for filling the compartment 124 with the desired fluid, as depicted in FIG. 5. In some embodiments, a plug 148 is inserted into the sealable port 122 to fluidly seal the compartment 124, when the fluid is contained therein.

In some embodiments, the base member 112 includes a fluid inlet 130 that is in fluid communication with the fluid reservoir 102.

In some embodiments, the fluid passageway 114 is configured to allow the passage of fluid from the fluid reservoir 102, through the nipple 104, to an infant's mouth. In some embodiments, the fluid passageway 114 extends internally through the compartment 124 from the nipple tip 118 to the base member 112, as depicted in FIG. 4. In some embodiments, the fluid passageway 114 is an enclosed passageway that is sealed from the surrounding compartment 124. In some embodiments, as depicted in FIGS. 4-5, the fluid passageway 114 is a hollow cylindrical tube including a channel 126 extending therethrough. In some embodiments, the fluid passageway 114 fluidly connects a fluid inlet 130 of the base member 112 and the fluid outlet 120 at the nipple tip 118. Thus, fluid is able to flow from the fluid reservoir 102, through the fluid inlet of the base member, the fluid passageway 114 and the fluid outlet 120, into the mouth of an infant.

In some embodiments, the length of the fluid passageway 114 can be varied. In some embodiments, the length of the fluid passageway 114 is 0.25 in to 1 in; or 0.5 in to 1 in; or 0.75 in to 1 in. In some embodiments, the length of the fluid passageway 114 is 0.25 in to 0.75 in; or 0.25 in to 0.5 in. In some embodiments, the length of the fluid passageway 114 is 0.5 in to 0.75 in.

In some embodiments, the fluid outlet 120 comprises at least one hole 132 positioned on the nipple tip 118, as depicted in FIG. 3. The at least one hole 132 is open to the fluid passageway 114 and allows for fluid to be expressed from the feeding device 100 into the mouth of an infant. In some embodiments, each of the at least one hole 132 is in fluid communication with a small diameter tube 134.

In some embodiments, each of the at least one hole 132 has a diameter equal to the corresponding small diameter tube 134. In some embodiments, each of the at least one hole 132 has a diameter of 0.006 in to 0.012 in; or 0.006 in to 0.010 in; or 0.006 in to 0.008 in. In other embodiments, each of the at least one hole 132 has a diameter of 0.006 in to 0.010 in; or 0.006 in to 0.008 in. In other embodiments, each of the at least one hole 132 has a diameter of 0.008 in to 0.010 in.

Figure 7:
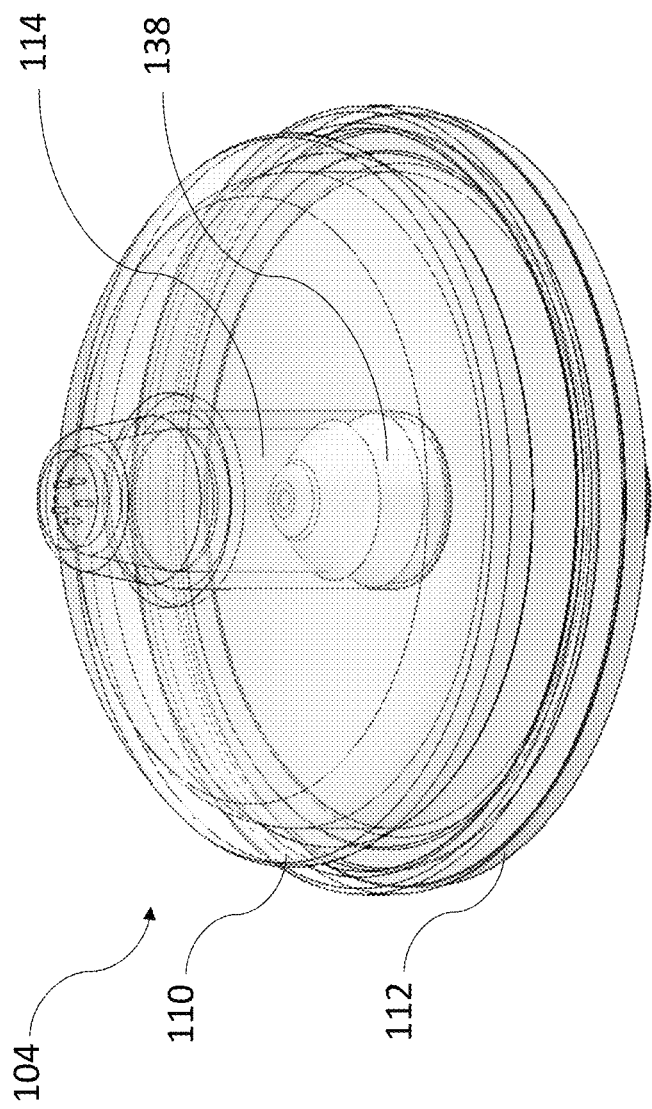
FIG. 7 is a see-through perspective view of a nipple of the feeding device having a base member with a barbed fitting, according to embodiments of the present disclosure.

In some embodiments, the base member 112 is connected to the body portion 110 by a barbed fitting 138, as depicted in FIG. 7. The barbed fitting 138, in some embodiments, extends from a first surface 140 of the base member 112. In some embodiments, the barbed fitting 138 is positioned on the base member 112 such that, when the base member 112 is attached to the body portion 110, the barbed fitting 138 is inserted into the fluid passageway 114. The barbed fitting 138 is shaped so as to provide an interference fit with the cylindrical tube of the fluid passageway 114. In some embodiments, the base member 112 is removably coupled to the body portion 110, via the barbed fitting 138, to allow cleaning of the interior of the body portion 110.

Figure 6:
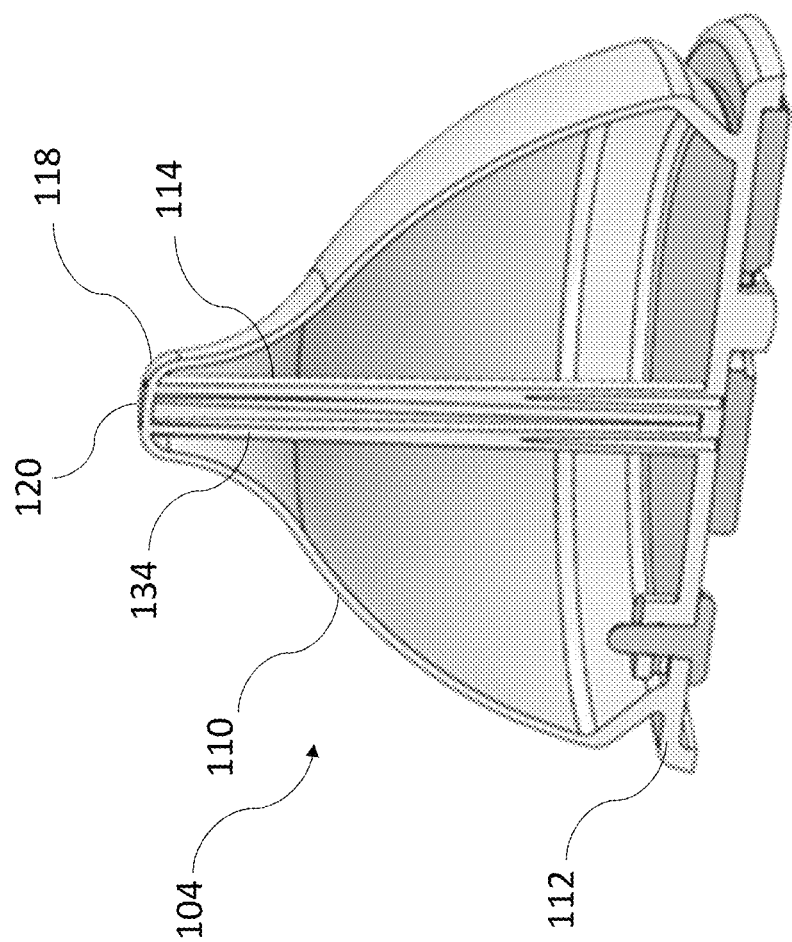
FIG. 6 is a cross-sectional view of a nipple of the feeding device with a fluid passageway having a series of small diameter tubes, according to embodiments of the present disclosure.

In some embodiments, however, the fluid passageway 114 is a series of small diameter tubes 134 connecting the opening in the fluid reservoir 102 to the fluid outlet 120 at the nipple tip 118, as depicted in FIG. 6. In some embodiments, each of the small diameter tubes 134 is in fluidly connected to a hole of the fluid outlet 120, as will be described in further detail below. In some embodiments, such as that of FIG. 6, the nipple 104 includes five small diameter tubes 134. However, in other embodiments, any number of tubes 134 may be incorporated into the nipple 104.

In some embodiments, the small diameter tubes 134 are sized to simulate lactiferous ducts in the mother's breast. In some embodiments, each of the small diameter tubes 134 has a diameter of 0.006 in to 0.012 in; or 0.008 in to 0.012 in; or 0.010 in to 0.012 in; or 0.006 in to 0.010 in; or 0.006 in to 0.008 in; or 0.008 in to 0.010 in.

In some embodiments, the small diameter tubes 134 comprise polypropylene or any other food grade plastic.

In the embodiment of FIG. 6, where the fluid passageway 114 comprises a series of small diameter tubes 134, the base member 112 is integrally formed with the body portion 110, as depicted in FIG. 6.

In some embodiments, the base member 112 is dimensionally compatible with a conventional baby bottle. For example, in some embodiments, the base member 112 includes a flange that compresses the flange 106 against the neck portion 128 of the fluid reservoir 102 to form a seal at edges. In other embodiments, the base member 112 includes a neck portion 180 with threading 182 that is configured to fit with the threading of the fluid reservoir 102 to form a seal, as will be described in further detail below.

Figure 9:
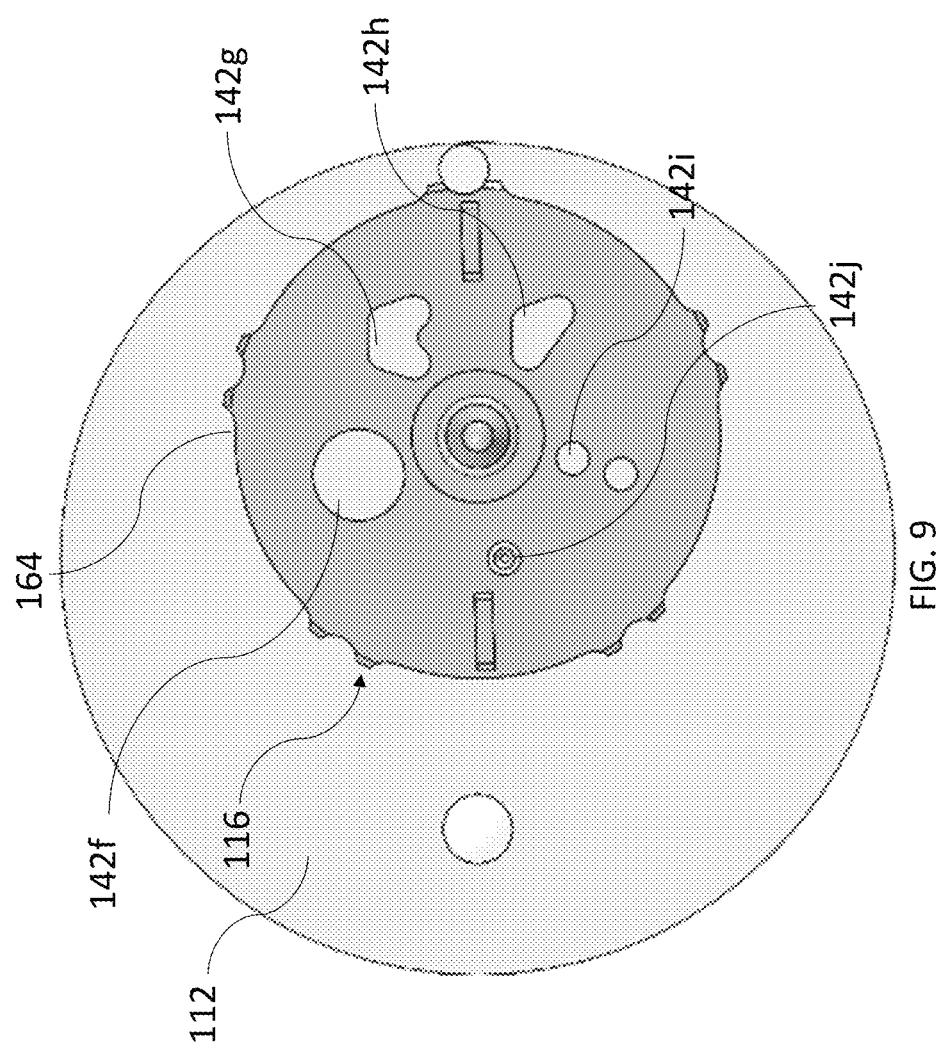
FIG. 9 is a bottom view of a base member and adjustable valve member of the nipple, according to embodiments of the present disclosure.
Figure 10:
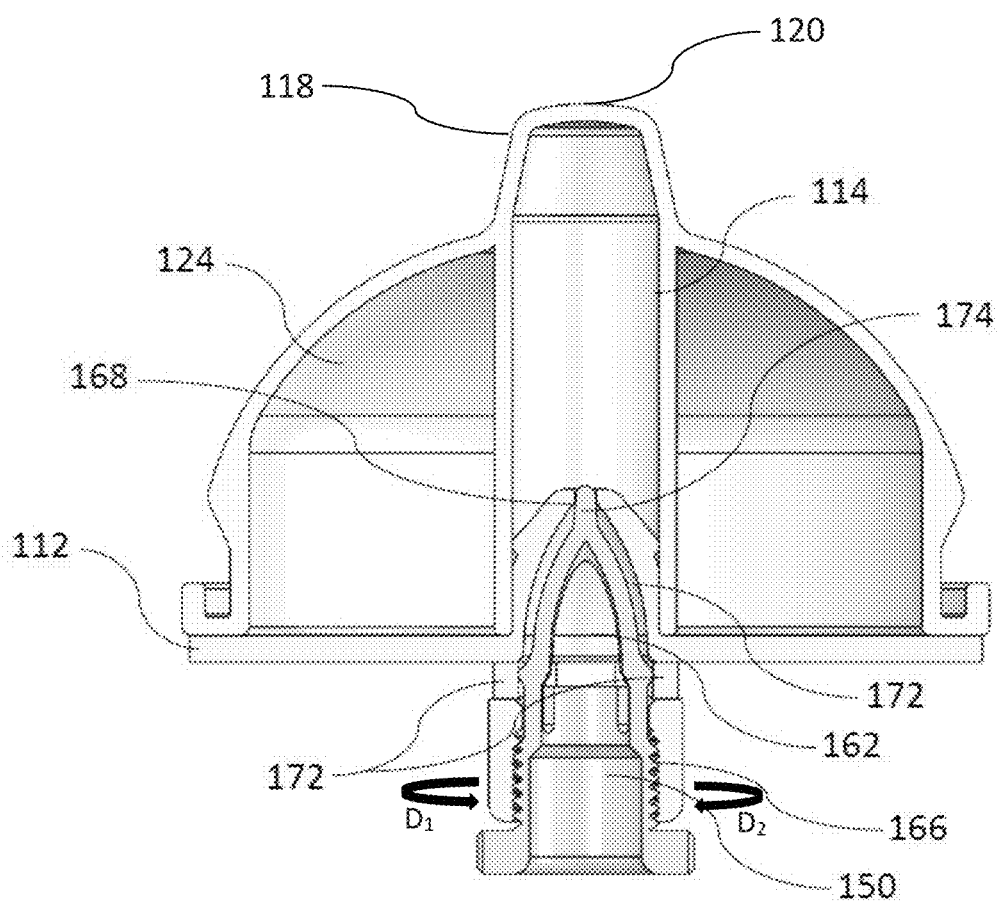
FIG. 10 is a cross-sectional view of a nipple of the feeding device including a threaded valve member, according to embodiments of the present disclosure.

In some embodiments, the adjustable valve member 116 is positioned on a surface of the base member 112 facing the fluid reservoir 102. In some embodiments, the adjustable valve member 116 is molded into the rigid plastic of the base member 112. In some embodiments, the base member 112 provides support for the adjustable valve member 116. The adjustable valve member 116 is configured to adjust the flow of fluid from the fluid reservoir 102 and into the fluid passageway 114. In some embodiments, as depicted in FIGS. 9-10, the adjustable valve member 116 comprises a rotating valve dial 164.

In some embodiments, the adjustable valve member 116 includes openings 142 of different shapes positioned radially thereabout. In some embodiments, the rotating valve dial 164 is attached to the base member 112 by a conventional barrel screw 144. In some embodiments, a rubber positioning stop 146 prevents the rotating valve dial 164 from moving from a desired position without the application of an external force, such as a user's finger.

In some embodiments, the adjustable valve member 116 is a unitary member formed of a resilient, flexible material. In some embodiments, the adjustable valve member 116 comprises polypropylene or another food grade plastic.

Figure 8:
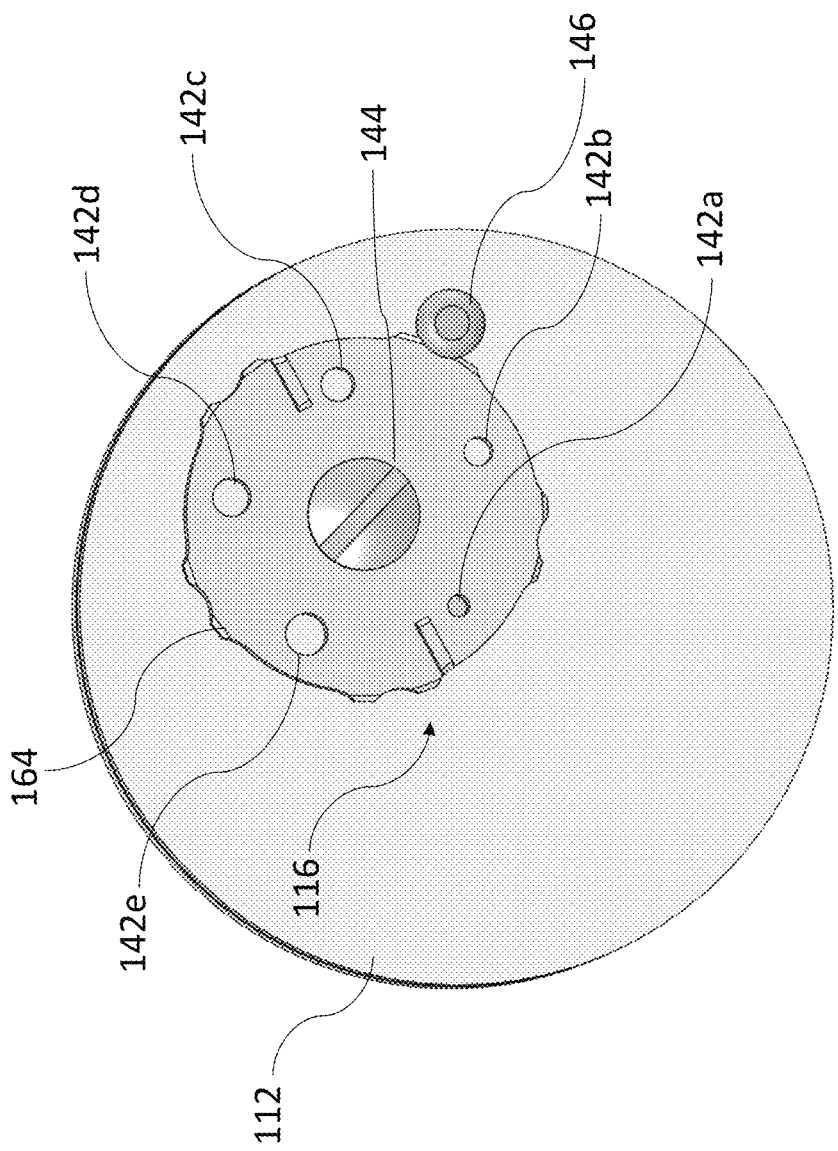
FIG. 8 is a bottom view of a base member and adjustable valve member of the nipple, according to embodiments of the present disclosure.

In some embodiments, each of the openings 142, due to their various shapes, provides a different fluid flow rate from the fluid reservoir 102 through the fluid passageway 114. In one embodiment, depicted in FIG. 8, where the fluid passageway 114 is a cylindrical tube, the openings 142 can be circular openings of increasing sizes. For example, as depicted in the figure, the rotating valve dial 164 of the adjustable valve member 116 includes five different openings 142*a-e*, with opening 142*a* having the smallest diameter, and thus, the slowest flow rate, and openings 142*b-e* having gradually increasing diameters for gradually increasing flow rates. Thus, by turning the rotating valve dial 164, the flow of fluid from the fluid reservoir 102 to the fluid passageway 114 can be adjusted, as desired.

In some embodiments, the flow rates can be adjusted from 3 mL/min to 85 mL/min; or from 5 mL/min to 85 mL/min; or from 10 mL/min to 85 mL/min; or from 25 mL/min to 85 mL/min; or from 50 mL/min to 85 mL/min; or from 75 mL/min to 85 mL/min; or from 3 mL/min to 75 mL/min; or from 3 mL/min to 50 mL/min; or from 3 mL/min to 25 mL/min; or from 3 mL/min to 10 mL/min; or from 3 mL/min to 5 mL/min; or from 5 mL/min to 25 mL/min; or from 50 mL/min to 75 mL/min; or from 10 mL/min to 50 mL/min.

In another embodiment, depicted in FIG. 9, where the fluid passageway 114 is a series of small diameter tubes 134, the openings 142 can have varying shapes that allow fluid flow through a specific number of the small diameter tubes 134. For example, as depicted in the figure, the rotating valve dial 164 of the adjustable valve member 116 includes five different openings 142*f-j*. Opening 142*f* is sized so that none of five small diameter tubes 134 extending through the nipple are blocked, allowing free flow through each of the small diameter tubes 134. Opening 142*g* is sized and shaped to only allow fluid to flow through four of the five small diameter tubes 134, for a slower flow than opening 142*f*. Similarly, opening 142*h* is sized and shaped to only allow fluid to flow through three of the five small diameter tubes 134, while opening 142*i* is sized and shaped to allow fluid to flow through two of the five small diameter tubes 134 and opening 142*j* only allows fluid to flow through one of the five small diameter tubes 134. Thus, by turning the rotating valve dial 164, the flow of fluid from the fluid reservoir 102 to the fluid passageway 114 can be adjusted as desired.

In some embodiments, as depicted in FIG. 10, in lieu of the adjustable valve member 116, the nipple 104 includes a threaded valve member 150 that infinitely meters the flow of milk into the fluid passageway 114. In some embodiments, the threaded valve member 150 is a two-part valve that does not disassemble but can be unscrewed to a back stop 162 for cleaning.

In some embodiments, the threaded valve member 150 includes the back stop 162, a threaded portion 166, a valve opening 168, two flow openings 170, a flow passageway 172 and a piston 174. In some embodiments, the threaded valve member 150 is molded into a base member 112 that caps off the opening 129 of the fluid reservoir 102 such that fluid only flows to the fluid passageway 114 via the valve opening 168. Fluid flows from the fluid reservoir 102 through each of the two flow openings 170 and into the flow passageway 172. The flow passageway 172 is in fluid communication with the valve opening 168. In some embodiments, the flow rate of the fluid from the flow passageway 172 through the valve opening 168 is adjusted via the threaded portion 166. Specifically, the threaded portion 166 is attached to the piston 174, which is positioned at the valve opening 168. The threaded portion 166 is rotatable along an axis thereof such that rotation of the threaded portion 166 in a first direction moves the piston 174 toward the valve opening 168, decreasing the fluid flow rate therethrough. The valve opening 168 is closed when the piston 174 plugs the valve opening 168 and the threaded portion 166 is no longer rotatable in the first direction. Conversely, rotation of the threaded portion 166 in a second, opposing direction moves the piston 174 away from the valve opening 168, increasing the fluid flow rate therethrough. The valve opening 168 is fully open when the piston 174 is adjacent to the back stop 162 such that the threaded portion 166 is no longer rotatable in the second direction.

In some embodiments, the flow rate of fluid through the valve opening 168 can be adjusted to from 3 mL/min to 85 mL/min; or from 5 mL/min to 85 mL/min; or from 10 mL/min to 85 mL/min; or from 25 mL/min to 85 mL/min; or from 50 mL/min to 85 mL/min; or from 75 mL/min to 85 mL/min; or from 3 mL/min to 75 mL/min; or from 3 mL/min to 50 mL/min; or from 3 mL/min to 25 mL/min; or from 3 mL/min to 10 mL/min; or from 3 mL/min to 5 mL/min; or from 5 mL/min to 25 mL/min; or from 50 mL/min to 75 mL/min; or from 10 mL/min to 50 mL/min.

In some embodiments, the nipple 104, when fully constructed, has a diameter of 3 in to 3.5 in; or 3.1 in to 3.5 in; or 3.2 in to 3.5 in; or 3.3 in to 3.5 in; or 3.4 in to 3.5 in; or 3 in to 3.4 in; or 3 in to 3.3 in; or 3 in to 3.2 in; or 3 in to 3.1 in; or 3.1 in to 3.4 in; or 3.2 in to 3.4 in; or 3.3 in to 3.4 in; or 3.2 in to 3.4 in; or 3.2 in to 3.3 in.

In some embodiments, the nipple 104 has a height (i.e., dimension from the base member to the nipple tip) of 1.75 in to 2 in; or 1.8 in to 2 in; or 1.85 in to 2 in; or 1.9 in to 2 in; or 1.95 in to 2 in; or 1.75 in to 1.95 in; or 1.75 in to 1.9 in; or 1.75 in to 1.85 in; or 1.75 in to 1.8 in; or 1.8 in to 1.95 in; or 1.8 in to 1.9 in; or 1.8 in to 1.85 in; or 1.9 in to 1.95 in.

Figure 11:
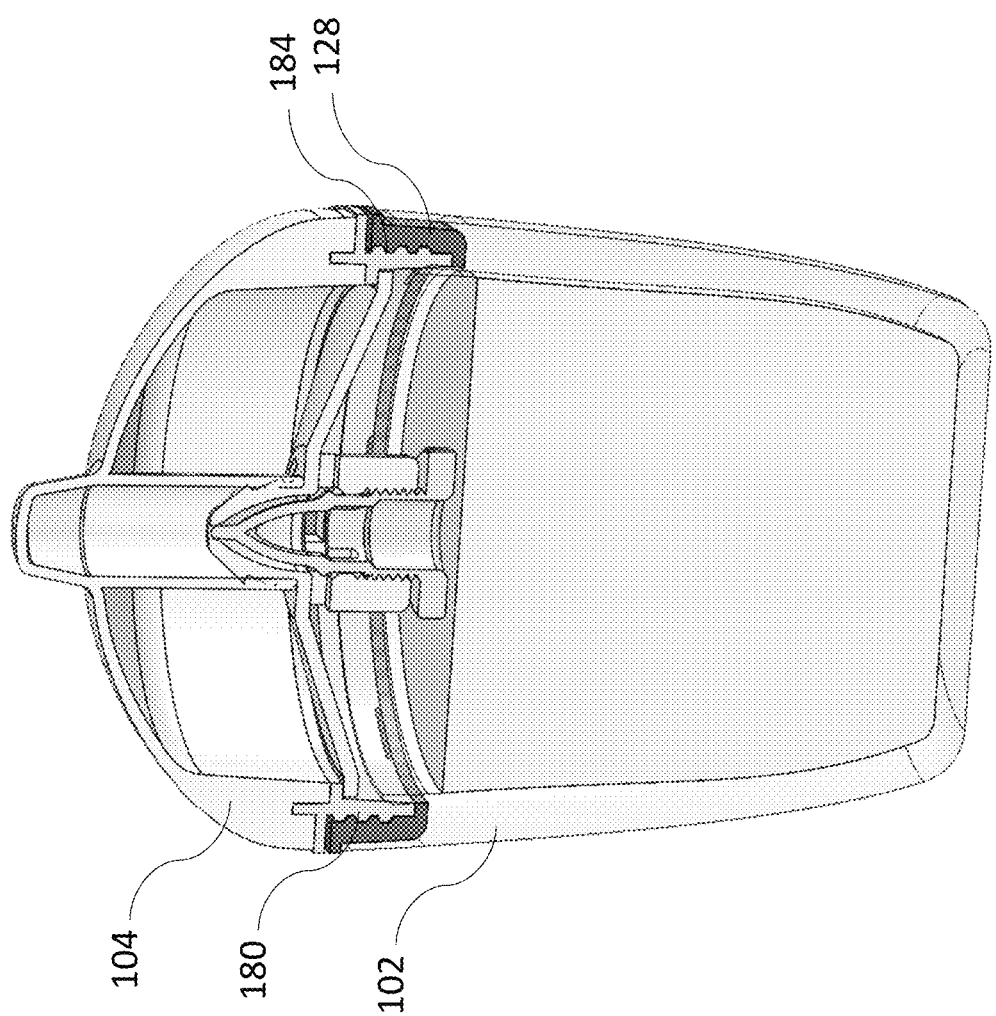
FIG. 11 is a cross-sectional view of a feeding device including a venting system, according to embodiments of the present disclosure.

In some embodiments, the feeding device 100 includes a venting system. As described above, in some embodiments, the nipple 104 includes a neck portion 180 configured to engage with the neck portion 128 of the fluid reservoir 102. In some embodiments, the neck portion 180 comprises threading 182 that is configured to engage with a threading 184 on the neck portion 128 of the fluid reservoir 102, as depicted in FIGS. 11-12.

Figure 12:
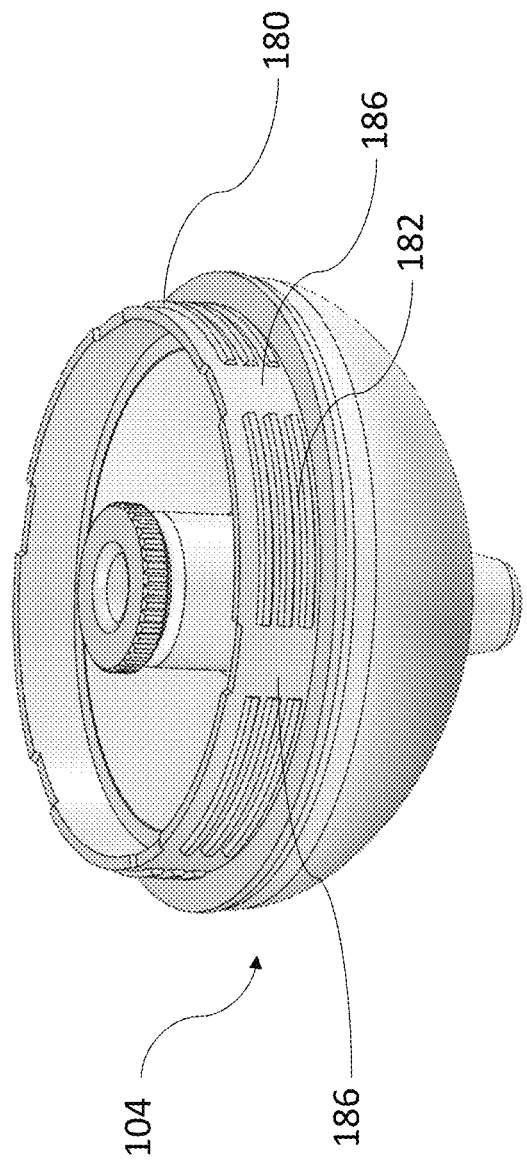
FIG. 12 is a perspective view of a nipple of the feeding device of FIG. 11 including vent holes, according to embodiments of the present disclosure.
Figure 13:
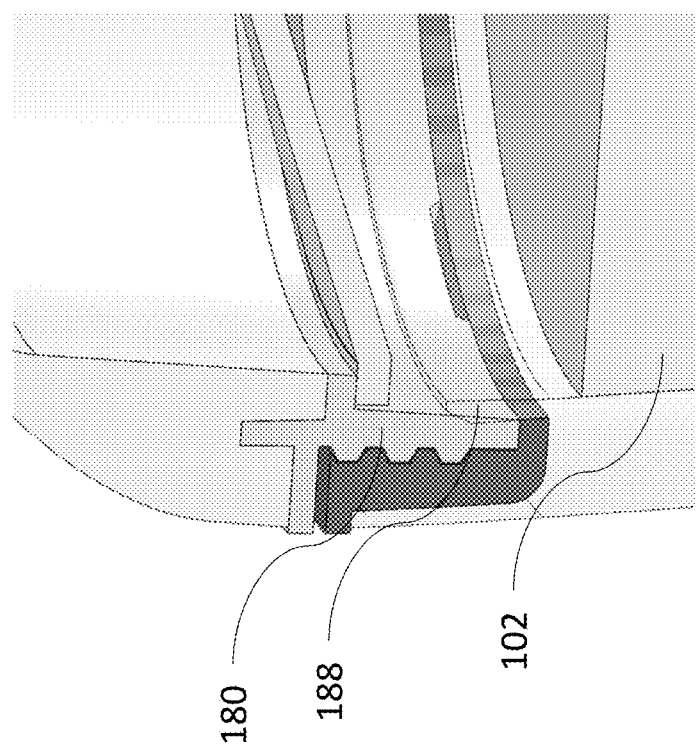
FIG. 13 is a perspective, cross-sectional view of the venting system of FIG. 11, according to embodiments of the present disclosure.

In some embodiments, as depicted in FIG. 12, the threading 182 of the nipple 104 comprises breaks therein which act as vent holes 186. The vent holes 186 allow air to enter the fluid reservoir 102 and replace vacuum pressure, preventing collapse of the nipple 104, allowing fluid to flow through the nipple 104, and alleviating discomfort in the infant during feeding. In some embodiments, the neck portion 180 comprises a flexible sealing lip 188, as depicted in FIG. 13. The flexible sealing lip 188 allows air to flow into the fluid reservoir 102, relieving pressure within the feeding device 100.

Figure 14:
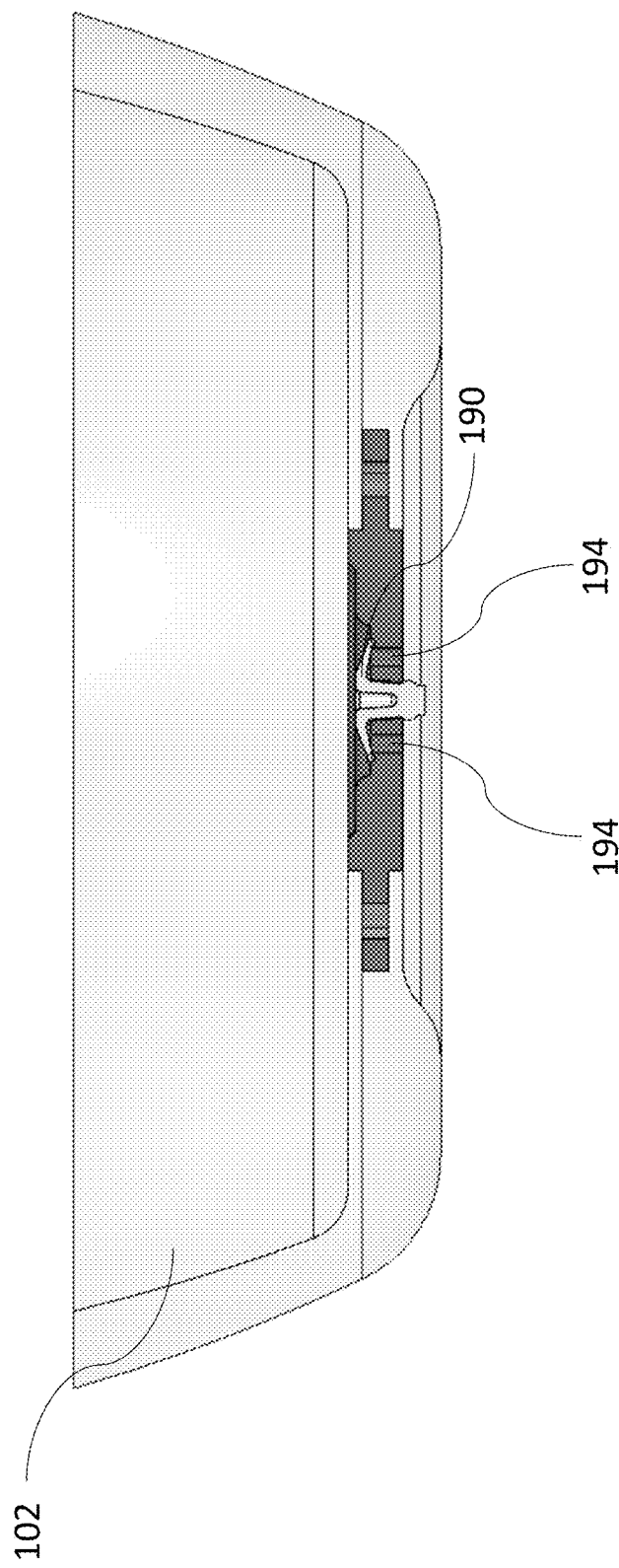
FIG. 14 is a cross-sectional view of a venting system in a base of a fluid reservoir, according to embodiments of the present disclosure.
Figure 15:
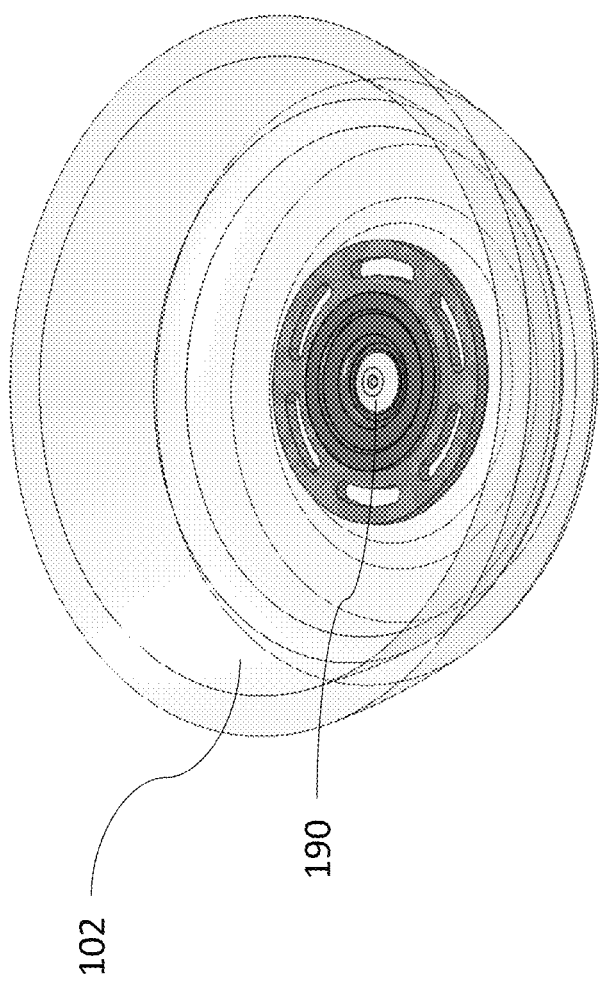
FIG. 15 is a top perspective view of the venting system of FIG. 14, according to embodiments of the present disclosure.

In some embodiments, as depicted in FIGS. 14-15, the fluid reservoir 102 comprises a flexible venting valve 190 at a base 192 thereof. As depicted in FIG. 15, the fluid reservoir 102 includes at least one vent hole 194. In use, air enters the at least one vent hole 194, flexing the flexible venting valve 190, and relieving vacuum pressure within the fluid reservoir 102.

In some embodiments, the nipple 104 is wholly constructed via 3D printing. 3D printing provides a cost-efficient way to construct various component parts, such as the small diameter tubes 134, which have dimensions that are so small as to be prohibitively expensive to produce by many other methods such as, for example, extrusion.

In some embodiments, a method for producing the nipple 104 via 3D printing is disclosed. In some embodiments, the nipple is made via 3D printing to closely resemble the shape of the mother's nipple. First, a conventional camera (e.g. incorporated in a smart phone, a 3D camera) is used to photograph a breast of the mother in the naturally occurring active state. For example, in some embodiments, the camera on a smartphone is used to image the nipple/breast area. In another example, an application on the smartphone is used to take the image, store the image and send the image via a confidential link to an approved site.

Next, the camera provides image data to an imaging computer, which creates an imaging file. The imaging computer then reproduces the structure of a region atop a standardized base member, that is suitable for use as a nipple for a conventional baby bottle or pacifier. In some embodiments, an application or website is used to fill out an online form requesting information such as, for example, bottle size, bottle composition, and other preferences. The reproduced structure is then sent to a 3D printer, which translates the imaged and prints the nipple based on the image, customizing the fit (e.g., threads) to a selected bottle.

In some embodiments, the imaging computer will identify landmarks with computer vision and produce a parametric 3D model that will be used to fabricate the custom 3D printed nipple.

In some embodiments, the material of the nipple 104 comprises a PVC plastic, latex or silicone based material (e.g. silicone, copolymer of silicone, or medical grade silicone).

In some embodiments, the artificial nipple structure is alternatively a pacifier closely resembling the actual nipple structure of a mother. The resulting nipple closely reproduces the active state nipple structure of a mother. For example, the pacifier may be printed as a one-piece article of manufacture on a base section including a plate with indentations to accommodate a baby's nose when the baby is sucking on nipple, together with a cylindrical base connected to grip ring.

In some embodiments, a method is provided for determining a peak vacuum range of an individual mother so as to customize the valve to mimic the sucking force required by an infant of the unique mother's nipple. The method uses a pressure gauge, an instrument that measures negative pressure, connected to a conventional breast pump to determine the peak vacuum range. Specifically, vacuum applied to the mother's nipple by the breast pump is measured by the pressure gauge. The pressure gauge needle points to a number from 0 to 450 mmHg, indicating the strength of the vacuum applied to the mother's nipple by the breast pump. It is noted that the pressure gauge measures the vacuum, not the speed, of the breast pump.

In some embodiments, the method includes first securely attaching a single bottle and all of the breast pump parts to the breast pump tubing. A conventional automatic breast pump includes a pump motor, a pump flange or shield, in which the mother's nipple is placed, and a hollow tubing connecting the pump motor, at a first end, to the pump flange, at a second end. The tubing is removable from both the pump motor and the pump flange so that each part can be cleaned.

To set up the pressure gauge so as to read a vacuum level provided by the breast pump, a first end of the tubing is attached to the pump motor, and the pressure gauge is inserted into the second end of the tubing. Once the breast pump and pressure gauge are set up, the pressure transducers of the pressure gauge are positioned at the same location as the pump shield would be placed during a pumping session with the mother. The breast pump is then turned on and the pump motor is set to a minimum/low vacuum level. The pressure gauge is then able to determine a vacuum strength provided by the pump through the tubing. Thus, the strength of vacuum applied by the breast pump to each breast is measured in the tubing. The pump motor vacuum setting for each breast is increased until the maximum level at which the mother indicates is her typical comfortable vacuum setting. A vacuum measurement is taken at this vacuum setting and the adjustable valve member 116 or the threaded valve member 150 of the nipple 104 is manufactured to mimic these numbers (either by 3D printing or other conventional methods (e.g. molds).

In some embodiments, based on the age of the infant, the geometry of the nipple is configured so as to result in a peak vacuum of −197±10 mmHg [28]; −150 mmHg. In some embodiments, for younger infants of 4-5 days old, the geometry of the nipple is configured so as to result in a lower vacuum on average peak vacuum −112 mmHg.

The disclosure of this application has been described above both generically and with regard to specific embodiments. It will be apparent to those skilled in the art that various modifications and variations can be made in the embodiments without departing from the scope of the disclosure. Thus, it is intended that the embodiments cover the modifications and variations of this invention provided they come within the scope of the appended claims and their equivalents.

What is claimed is:
1. A feeding device comprising:
a fluid reservoir;
a nipple configured to be attached to the fluid reservoir;
  wherein the nipple comprises:
    a body portion comprising a nipple tip comprising a fluid outlet;
    a base member configured to be attached to the body portion;
      wherein the base portion and the body portion of the nipple together define an enclosed compartment configured to contain liquid within the nipple;
      wherein the base member comprises an attachment portion configured to attach the nipple to the fluid reservoir;
      wherein the base member comprises a fluid inlet that is in fluid communication with the fluid reservoir;
      wherein the base member is connected to the body portion via a barbed fitting;
    a fluid passageway extending through the compartment from the fluid inlet of the base member to the nipple tip;
      wherein the fluid passageway is configured to allow fluid to flow from the fluid reservoir to the fluid outlet; and
      wherein the base member comprises an adjustable fluid valve member;
        wherein the adjustable fluid valve member is configured to adjust a flow rate of fluid from the fluid reservoir into the fluid passageway.
2. The feeding device of claim 1, wherein the adjustable fluid valve member comprises a rotating valve dial comprising at least two openings;
  wherein the at least two openings are different in size such that each of the at least two openings allows fluid to flow into the fluid passageway at a different flow rate.
3. The feeding device of claim 1, wherein the base member comprises a sealable port fluidly connected to the compartment;
  wherein the sealable port is configured to allow fluid to be provided to the compartment.
4. The feeding device of claim 1, wherein the nipple comprises an enclosed compartment configured to contain a liquid.
5. The feeding device of claim 4, wherein the liquid comprises water, oil or a combination thereof.
6. The feeding device of claim 4, wherein the base member comprises a sealable port fluidly connected to the enclosed compartment, wherein the sealable port is configured to allow the liquid to be provided to the enclosed compartment.

7. The feeding device of claim 1, wherein:
the nipple comprises a first neck portion; and
the fluid reservoir comprises a second neck portion, wherein the first neck portion is configured to engage with the second neck portion.

8. The feeding device of claim 1, wherein the first neck portion comprises a first threading.

9. The feeding device of claim 8, wherein the second neck portion comprises a second threading configured to engage with the first threading to fluidly seal the nipple and the fluid reservoir.

10. The feeding device of claim 8, wherein the first threading comprises at least one break therein.

* * * * *